United States Patent [19]
Holms

[11] Patent Number: 5,350,334
[45] Date of Patent: Sep. 27, 1994

[54] MEAT SKINNING MACHINE WITH PIVOTAL DEFLECTOR PLATE

[75] Inventor: Donald D. Holms, Des Moines, Iowa

[73] Assignee: Townsend Engineering Company, Des Moines, Iowa

[21] Appl. No.: 121,609

[22] Filed: Sep. 15, 1993

[51] Int. Cl.⁵ .............................................. A22C 17/12
[52] U.S. Cl. .................................. 452/127; 452/125; 83/105; 99/589
[58] Field of Search ...................... 452/127, 136, 125; 83/102, 105, 707; 99/589

[56] References Cited

U.S. PATENT DOCUMENTS

| | | | |
|---|---|---|---|
| 2,522,728 | 9/1950 | Townsend | 452/127 |
| 3,545,036 | 12/1970 | Fischer et al. | 452/127 |
| 3,769,903 | 11/1973 | Greider | 452/127 |
| 4,466,344 | 8/1984 | Schill | 452/127 |
| 4,793,026 | 12/1988 | Braeger et al. | 452/125 |

FOREIGN PATENT DOCUMENTS 2420188 11/1975 Fed. Rep. of Germany ...... 452/125
2464030 3/1981 France ........................... 452/125

Primary Examiner—Willis Little
Attorney, Agent, or Firm—Zarley, McKee, Thomte, Voorhees & Sease

[57] ABSTRACT

A meat skinning machine has a frame, an elongated skinning blade with a cutting edge, a rotatable gripping roll positioned adjacent the blade, and a motor operatively connected to the gripping roll. The skinning machine is also provided with a pivotal deflector plate for deflecting a meat product upwardly as the product is fed past the blade. The angle of the deflector plate is adjustable to accommodate different meat products and different operators. In one embodiment, the distance between the deflector plate and the skinning blade is also adjustable. The upward deflection of the meat product allows the product to be flipped forwardly to a position in front of the skinning blade for additional feeding past the skinning blade, without the operator reaching across the skinning blade to pick up or grasp the meat product.

9 Claims, 2 Drawing Sheets

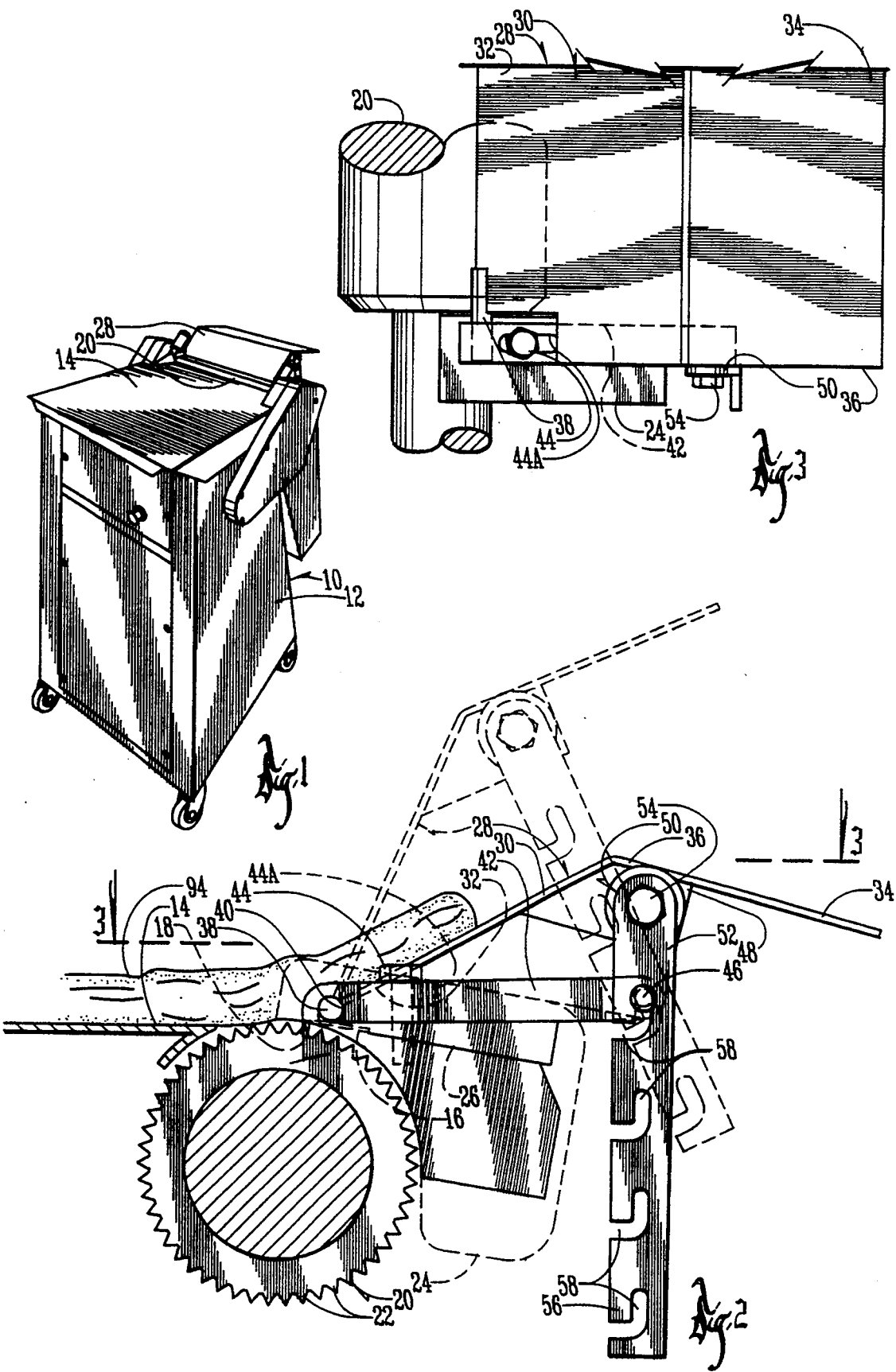

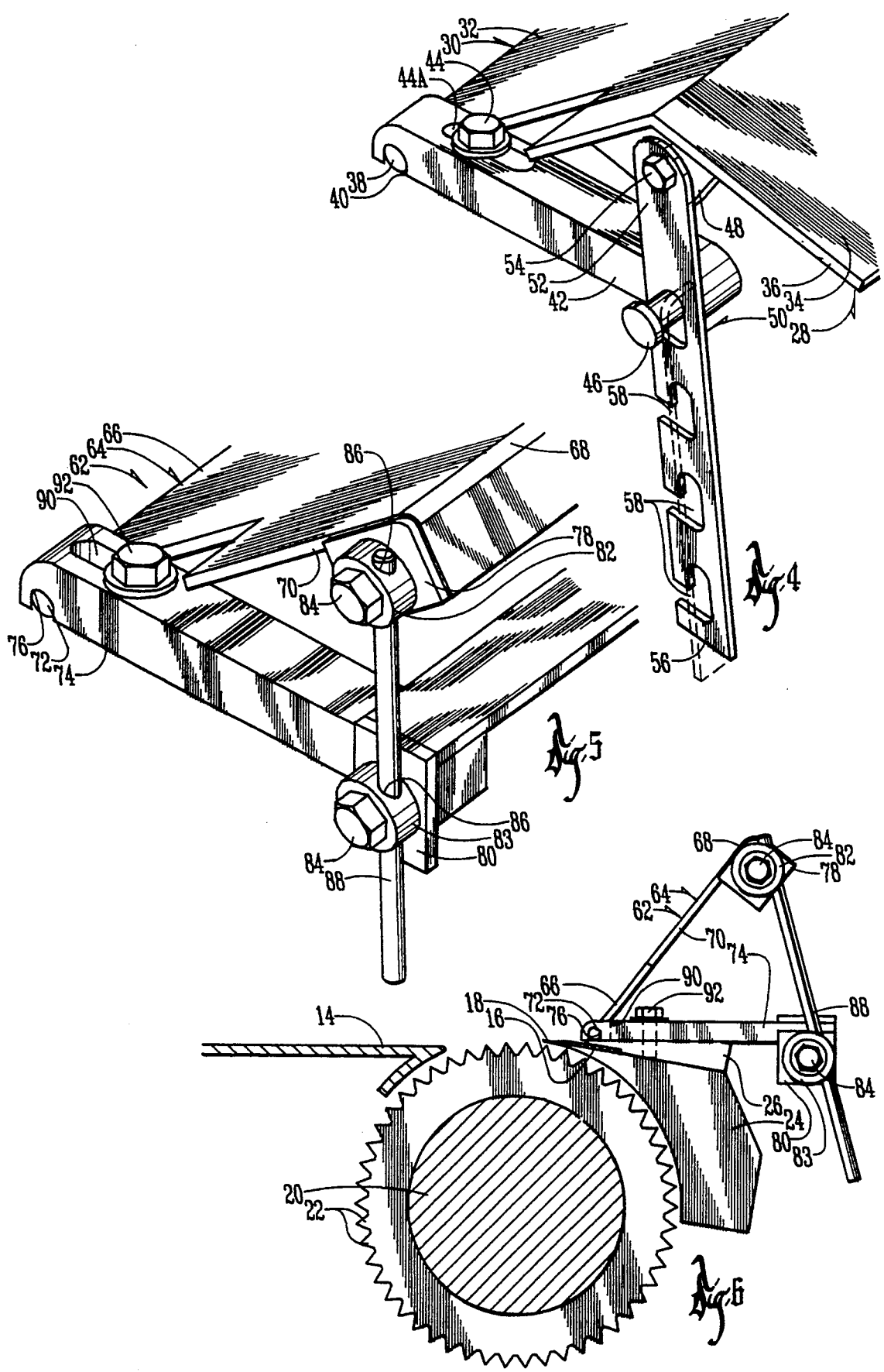

MEAT SKINNING MACHINE WITH PIVOTAL DEFLECTOR PLATE

BACKGROUND OF THE INVENTION

Meat skinning machines adapted to remove skin or membrane from meat, poultry or fish products have long been in existence. These machines include an elongated skinning blade with a sharp cutting edge which is positioned adjacent a gripping roll having a plurality of teeth thereon for pulling the meat product towards the cutting edge of the blade. For certain meats, the meat product must be passed by the cutting edge of the blade several times to completely remove the skin or membrane. With prior art skinning machines, the operator of the meat skinning machine reaches over the blade after the first pass of the meat product, picks up the meat product and brings it back to the forward side of the blade, and turns or flips the meat product before the product is passed a second time over the skinning blade to remove additional skin or membrane. Such operation presents hazards to the operator, since the meat product is typically cold and operator's hands are cold, thus inhibiting the operator's dexterity in handling the meat product. Also, some meat products, such as livers, are heavy and hard to handle, thereby increasing the risk of injury to the operator. Furthermore, the physical characteristics of the operator, such as his or her height and weight, may increase the hazards due to stretching.

More recently, rigid deflector plates have been employed on skinning machines to reduce the risk of injury to the operator. The prior art deflector plates are fixed at a specific angle relative to the blade, and direct the meat upwardly away from the blade after a portion of the meat product passes the cutting edge of the blade. The deflector plate thus allows the operator to flip the meat product, without grasping, to a position in front of the skinning blade such that the second pass of the meat product across the skinning blade can be more readily accomplished with decreased chance of injury to the operator. However, since the prior art deflector plates are not adjustable, different sized operators still are presented with risk of injury. Also, the fixed angular relationship of the deflector plate relative to the blade does not accommodate different types of meat.

Therefore, a primary objective of the present invention is the provision of an improved meat skinning machine having a pivotal deflector plate.

Another objective of the present invention is the provision of a deflector plate for a meat skinning machine which can be set at various angles relative to the skinning blade of the machine.

A further objective of the present invention is the provision of a deflector plate for a meat skinning machine which can be moved forwardly or rearwardly so as to adjust the distance between the plate and the cutting edge of the skinning blade of the machine.

Another objective of the present invention is the provision of a method for skinning meat on a meat skinning machine wherein the angle of a deflector plate is pivotally adjusted relative to the blade prior to feeding the meat into the cutting blade of the machine, such that the meat is deflected upwardly by the deflector plate as the meat passes the cutting blade.

Yet another objective of the present invention is the provision of a deflector plate for a meat skinning machine which is economical to manufacture, and durable and safe in use.

SUMMARY OF THE INVENTION

The invention utilizes a conventional meat skinning machine having a frame, an elongated skinning blade with a cutting edge, a rotatable gripping roll positioned adjacent the blade, and a motor operatively connected to the gripping roll. A novel adjustable deflector plate is provided on the skinning machine to deflect a meat product upwardly as the meat is fed past the skinning blade. The deflector plate is pivotally connected to the frame of the skinning machine such that the angle of the plate relative to the blade can be adjusted. In a preferred embodiment, the angular position of the plate relative to the blade is adjusted by positioning a cross bar in one of a plurality of slots in a support arm. In another embodiment, an elongated rod at each end of the deflector plate is slideably received within a bushing such that the angle of the plate relative to the blade can be adjusted. In the second embodiment, the deflector plate is also slidably connected to the frame such that the distance between the deflector plate and the blade can be adjusted.

BRIEF DESCRIPTION OF THE DRAWINGS

FIG. 1 is a perspective view of the skinning machine of the present invention.

FIG. 2 is partial side elevation view of the skinning machine showing a first embodiment of the deflector assembly.

FIG. 3 is a partial top plan view taken along lines 3—3 of FIG. 2.

FIG. 4 is a partial perspective view of the deflector assembly shown in FIG. 2.

FIG. 5 is a partial perspective view of an alternative embodiment deflector assembly.

FIG. 6 is a partial side sectional view similar to FIG. 2 showing the alternative embodiment deflector assembly.

DETAILED DESCRIPTION OF THE PREFERRED EMBODIMENT

With reference to the drawings, a meat skinning machine 10 includes a frame 12, an upper table 14, an elongated skinning blade 16 with a sharp cutting edge 18 and a gripping roll 20 having a plurality of sharp teeth 22 on its outer surface. The gripping roll 20 is rotatably mounted upon the frame 12 and is powered by an electric motor (not shown). The blade 16 is mounted between a shoe 24 and a clamping plate 26.

The above-described components of the skinning machine 10 are conventional, and do not form a part of the present invention.

The present invention is directed towards a deflector assembly 28 which is mounted on the skinning machine 10 adjacent the cutting edge 18 of the skinning blade 16 so as to deflect meat upwardly as the meat is fed past the blade. More particularly, a preferred embodiment of the deflector assembly 28 is shown in FIGS. 2-4. The deflector assembly 28 includes a deflector plate 30 having a lower forward edge 32, an upper rearward edge 34, and opposite sides 36. A pin or shaft 38 extends laterally outwardly from each side 36 of the plate 30 adjacent the forward edge 32 thereof. Each shaft 38 is pivotally mounted in recess 40 on the ends of arms 42 such that the deflector plate 30 is pivotal about the axes of the shafts 38.

The pair of support arms 42 are secured to shoe 24 by a bolt or screw 44 adjacent each side 36 of the deflector plate 30. Bolts 44 extend through slots 44A in arms 42 (FIG. 4). A pin 46 extends outwardly from the ends of the support arms 42 opposite to the end having slots 44A. The deflector plate 30 includes a pair of tabs or ears 48 which are secured to the rearward surface of the plate adjacent the opposite sides thereof. The deflector assembly 28 also includes a pair of adjustment arms 50, each of which is secured at its forward end 52 to one of the tabs 48 by a nut and bolt assembly 54. Each adjustment arm 50 has a rearward end 56, and a plurality of notches or slots 58 between the forward end 52 and the rearward end 56. The slots are adapted to selectively receive the cross bar 46 such that the angle of the deflector plate 30 relative to the skinning blade 16 is adjustable. The slots 58 are preferably L-shaped such that the cross bar 46 is retentively engaged within the desired slot, and can be moved to a different slot without the use of tools.

An alternative embodiment deflector assembly 62 as shown in FIGS. 5 and 6. The deflector assembly 62 includes a deflector plate 64 having a lower forward edge 66, an upper rearward edge 68, and opposite sides 70. A shaft or pin 72 extends laterally outwardly from each side 70 of the deflector plate 64 adjacent the forward edge 66 thereof. A pair of mounting brackets 74 are secured to the clamping plate 26, with one bracket being located at each side of the deflector plate 30. Each bracket includes a recess 76 at the forward end 78 thereof. The recesses 76 are adapted to pivotally receive one of the shafts 72.

A tab or ear 78 is attached to the rearward surface of the deflector plate 64 adjacent the rearward edge 68 and sides 70 thereof. Similarly, a tab 80 is secured to the rearward end of each bracket 74. Each tab 78, 80 includes a bushing 82, 83 respectively, secured thereto by a nut and bolt assembly 84. Each bushing 82, 83 includes a hole 86 therein offset with respect to the nut 84. A pair of angle adjustment rods 88 located on each side of the deflector plate 64 extend through the holes 86 in the respective bushings 82, 83. When the bolts 84 are loosened, the rods 88 will slide within the hole 86 on at least one of the bushings 82, 83, while the opposite bushing pivots about the axis of bolt 84, such that the deflector plate 64 can pivot about the axis of shafts 72. Thus, the angle of the plate 64 relative to the skinning blade 16 can be raised or lowered.

Also, the mounting brackets 74 each include an axially extending slot 90 through which a securing bolt 92 extends for securing a bracket to the clamping plate 26. When the bolt 92 is loosened, the brackets 74 can be moved forwardly or rearwardly, such that the distance between the forward edge 66 of the deflector plate 64 and the cutting edge 18 of the skinning blade 16 can be adjusted.

Both of the deflector assemblies 28 and 62 allow the respective deflector plate 30, 64 to be angularly adjusted such that the meat product will be deflected upwardly as the meat product 94 is fed past the cutting edge 18 of the skinning blade 16. The angle of the deflector plate depends upon the type of meat product being skinned, and upon the physical characteristics of the operator, including his or her height, weight, and reach. Preferably, the range of pivotal movement of the deflector plate is between 10°–70°, such that the plate will lie nearly flat or be nearly vertical. As the meat product 94 is deflected upwardly by the deflector plate, the operator can merely flip the meat forwardly to a position in front of the blade 16, so that the meat can be fed into the blade for additional skinning or membrane removal by the blade 16, without having to grasp or pick up the meat product at a location downstream from the skinning blade 16.

Also, with the assembly 62, the distance between the forward edge 66 of the deflector plate 64 and the cutting edge 18 of the skinning blade 16 can be adjusted approximately one inch via the slot 90 in the mounting brackets 74. It is desirable to adjust the space between the deflector plate 64 and the blade 16, depending upon the type of meat product being skinned.

The preferred embodiment of the invention has been set forth in the drawings and specifications, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

From the foregoing, it can be seen that the present invention accomplishes at least all of the stated objectives.

What is claimed is:

1. An improved meat skinning machine having a frame, an elongated skinning blade with a cutting edge, a rotatable gripping roll positioned adjacent the blade, and a motor operatively connected to the gripping roll, the improvement comprising:

an elongated deflector plate pivotally connected to the frame and having opposite forward and rearward edges and opposite sides, the forward edge being positioned closely to the blade so as to deflect meat upwardly after the meat engages the blade; and angle adjustment means for adjusting the angle of the deflector plate relative to the blade.

2. The improved skinning machine of claim 1 wherein the angle adjustment means includes an elongated rigid member on each side of the deflector plate, and each member having a first end pivotally attached to the deflector plate and a distal second end, the member having a plurality of slots between the first and second ends, and a support bar selectively received in one of the slots to support the deflector plate at a desired angle relative to the blade.

3. The improved skinning machine of claim 1 wherein the angle adjustment means includes an elongated rigid member on each side of the deflector plate, and each member having opposite ends, a first bushing connecting the first end of the member to the deflector plate, and a second bushing connecting the second end of the member to the frame.

4. The improved skinning machine of claim 3 wherein one of the bushings provides a pivotal connection and the other bushing provides a slidable connection to the rigid member.

5. The improved skinning machine of claim 1 further comprising space adjustment means for adjusting the distance between the deflector plate and the blade.

6. The improved skinning machine of claim 5 wherein the space adjustment means includes a bar connected to each side of the deflector plate, each bar having a slot extending perpendicular to the cutting edge of the blade, and fastener means extending through the slot and into the frame, the bars being movable along the slots to adjust the position of the deflector plate relative to the cutting edge of the blade.

7. A method of removing membrane from a meat product on a meat skinning machine having a frame, an elongated skinning blade with a cutting edge, a rotatable gripping roll positioned adjacent the blade, a motor operatively connected to the gripping roll, and a deflector plate pivotally attached to the frame adjacent the blade, the method comprising:

pivotally adjusting the angle of the deflector plate relative to the blade;

feeding the meat product into the blade to remove membrane therefrom; and deflecting the meat product upwardly on the deflector plate as the meat product passes the blade.

8. The method of claim 7 further comprising adjusting the distance between the deflector plate and the cutting edge of the blade.

9. The method of claim 7 further comprising flipping the meat product forwardly to a position in front of the blade and feeding the meat product into the blade to remove additional membrane therefrom.

* * * * *